US012565862B2

(12) United States Patent
Kiyono

(10) Patent No.: US 12,565,862 B2
(45) Date of Patent: Mar. 3, 2026

(54) THROTTLE APPARATUS FOR ENGINE

(71) Applicant: MIKUNI CORPORATION, Tokyo (JP)

(72) Inventor: Jun Kiyono, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 12 days.

(21) Appl. No.: 18/634,102

(22) Filed: Apr. 12, 2024

(65) Prior Publication Data

US 2024/0344483 A1 Oct. 17, 2024

(30) Foreign Application Priority Data

Apr. 17, 2023 (JP) ................................ 2023-067137

(51) Int. Cl.
*F02D 9/10* (2006.01)

(52) U.S. Cl.
CPC ........... *F02D 9/109* (2013.01); *F02D 9/1065* (2013.01)

(58) Field of Classification Search
CPC ........... F02D 2009/0279; F02D 9/1065; F02D 9/109; F02M 35/116; F02M 35/162
See application file for complete search history.

(56) References Cited

U.S. PATENT DOCUMENTS

2002/0185323 A1* 12/2002 Tsutsumi ............. F02M 35/116 180/219
2003/0213464 A1* 11/2003 Geyer .................... F02M 17/04 123/336
2005/0133004 A1* 6/2005 Maehara ................. F02D 11/10 123/336
2006/0213475 A1* 9/2006 Sekimoto ......... F02M 35/10216 123/184.35
2009/0007884 A1* 1/2009 Bunne .................... B62K 23/04 180/219
2013/0133617 A1 5/2013 Machida et al.

FOREIGN PATENT DOCUMENTS

DE 102 49 717 5/2015
JP 58-174134 10/1983
JP 2008-38635 2/2008
JP 2009-236098 10/2009
JP 5899591 4/2016
JP 2019-56323 4/2019

OTHER PUBLICATIONS

Extended European Search Report dated Sep. 9, 2024 for European Application No. 24167295.5.

* cited by examiner

*Primary Examiner* — Robert K Arundale
(74) *Attorney, Agent, or Firm* — STAAS & HALSEY LLP

(57) ABSTRACT

A throttle apparatus for an engine according to the present invention includes a pair of throttle bodies 2*f* and 2*r* disposed between a pair of banks Bf and Br of a V-type engine E, a pair of throttle bores 3 provided in the respective throttle bodies 2*f* and 2*r* and configured to guide intake air, throttle valves 5 supported to be openable/closable by a pair of throttle shafts 4 intersecting an arrangement direction of the banks and an axial direction of the throttle bores 3 and parallel to each other, and coupling portions 28 and 23 extending from the respective throttle bodies 2*f* and 2*r* in a direction approaching each other and configured to couple the throttle bodies 2*f* and 2*r* by being fastened at abutting portions 28*b* and 23*c* superimposed on each other with fastening members 30.

7 Claims, 9 Drawing Sheets

THROTTLE APPARATUS FOR ENGINE

CROSS REFERENCE TO RELATED APPLICATIONS

This application claims priority benefit from Japanese Patent Application No. 2023-067137 filed on Apr. 17, 2023 the contents which are incorporated herein by reference.

BACKGROUND OF THE INVENTION

Field of the Invention

The present invention relates to a throttle apparatus for an engine.

Description of the Related Art

For example, in a throttle apparatus disclosed in Patent Document 1, a pair of throttle bodies are disposed between banks of a V-type two-cylinder engine, and the throttle bodies are connected to respective corresponding banks. Throttle bores of the throttle bodies communicate with respective intake air passages of the banks. Throttle valves are supported by throttle shafts inside the respective throttle bores, and intake air amounts into cylinders of the respective banks are adjusted based on opening/closing of the throttle valves.

To improve assembling easiness of the throttle bodies to the engine and assembling rigidity of the throttle bodies after assembly, the throttle bodies are connected to each other through connection plates. In an axial direction of the throttle shafts, the connection plates are disposed on one side and the other side of the throttle bodies, and the throttle bodies are connected to each other through the connection plates. As a result, when the throttle bodies are assembled to the engine, the throttle bodies can be previously connected and assembled to each other through the connection plates, and can be collectively assembled to the engine. In addition, the throttle bodies after assembly are supported from the engine side and are connected to each other through the connection plates as well. This makes it possible to improve assembling rigidity to the engine, and to prevent trouble such as failure caused by vibration applied from the engine.

PRIOR ART DOCUMENT

Patent Document

Patent Document 1: Japan Patent No. 5899591

In the throttle apparatus disclosed in Patent Document 1, however, the structure in which the throttle bodies are connected through the connection plates causes problems in terms of a weight, an occupied space, and a manufacturing cost.

More specifically, to firmly connect the throttle bodies, for example, each of the connection plates is made of a steel material having a sufficient thickness. Such connection plates are provided on the one side and the other side, which increases the weight of the throttle apparatus.

In addition, the connection plates are provided on the one side and the other side of the throttle bodies, which increases an outer dimension of the throttle apparatus in the axial direction of the throttle shafts, and accordingly increases the space occupied by the throttle apparatus. Therefore, for example, the throttle apparatus protrudes to the one side and the other side in a gap between the banks of the engine, and restricts arrangement of peripheral parts.

To connect the throttle bodies through the connection plates, it is necessary to fasten the connection plates and the throttle bodies with screws and the like at least four positions in total on the one side and the other side of the throttle bodies. In addition, at this time, it is necessary to perform operation of fastening the screws from different directions between the one side and the other side. Therefore, it is hard to say that assembling easiness is excellent, due to large man-hours. Furthermore, labor and a material cost are required to fabricate the two connection plates, and these factors cause increase in manufacturing cost.

The present invention has been made to solve such problems, and is directed to a throttle apparatus for an engine in which the throttle bodies disposed between the banks of the V-type engine are connected to each other to improve assembling easiness to the engine and assembling rigidity while increase of the weight, enlargement of the occupied space, and increase of the manufacturing cost are prevented.

SUMMARY OF THE INVENTION

To achieve the above-described object, a throttle apparatus for an engine according to the present invention includes a pair of throttle bodies disposed side by side in an arrangement direction of a pair of banks constituting a V-type engine, between the banks, a pair of throttle bores provided in the respective throttle bodies, and configured to guide intake air into cylinders of the pair of banks, a pair of throttle valves supported to be openable/closable inside the respective throttle bores, by a pair of throttle shafts, the pair of throttle shafts each intersecting the arrangement direction of the banks and an axial direction of the throttle bores and being parallel to each other, and a pair of coupling portions provided integrally with the respective throttle bodies and extending in a direction approaching each other, and configured to couple the pair of throttle bodies by being fastened at abutting portions superimposed on each other with fastening members.

As another aspect, the throttle apparatus for an engine may further include a motor unit, and an interlocking mechanism. One of the pair of throttle bodies may be a main throttle body having, as a driving protrusion end, one end of one corresponding of the throttle shafts protruding outside, the other of the pair of throttle bodies may be a sub-throttle body having, as a driven protrusion end, one end of the other of the throttle shafts protruding outside, the motor unit may be connected to the other end of the throttle shaft of the main throttle body, and open/close the throttle valve through the throttle shaft by using a motor as a driving source, and the interlocking mechanism may be provided between the driving protrusion end and the driven protrusion end, and transmit turning of the driving protrusion end to the driven protrusion end.

As still another aspect, one of the pair of coupling portions may include the abutting portions at two positions separated in an axial direction of the throttle shaft, and include screw holes provided in the respective abutting portions, the other of the pair of coupling portions may include the abutting portions at two positions separated in the axial direction of the other of the throttle shafts, and include female screw holes provided in the respective abutting portions, and the fastening members may be a pair of screws screwed into the respective female screw holes through the screw holes from one direction.

As still another aspect, axes of the pair of throttle bores may be inclined at different angles in a side view along the throttle shafts, and the screw holes or the female screw holes may be provided to be parallel to the axis of the throttle bore of the throttle body in which the screw holes or the female screw holes themselves are provided.

As still another aspect, the pair of coupling portions may be set to be substantially equal to each other in dimension from the corresponding throttle body to the abutting portions.

As still another aspect, each of the pair of coupling portions may have a shape tapered from the corresponding throttle body to the abutting portions in a side view along the throttle shafts.

As still another aspect, each of the pair of coupling portions may have the tapered shape through formation of a triangular rib in the side view along the throttle shafts.

According to the throttle apparatus for an engine of the present invention, the throttle bodies disposed between the banks of the V-type engine can be connected to each other to improve assembling easiness to the engine and assembling rigidity while increase of the weight, enlargement of the occupied space, and increase of the manufacturing cost are prevented.

DETAILED DESCRIPTION OF THE INVENTION

An embodiment in which the present invention is embodied in a throttle apparatus for a V-type two-cylinder engine mounted on a motorcycle is described below.

Figure 1:
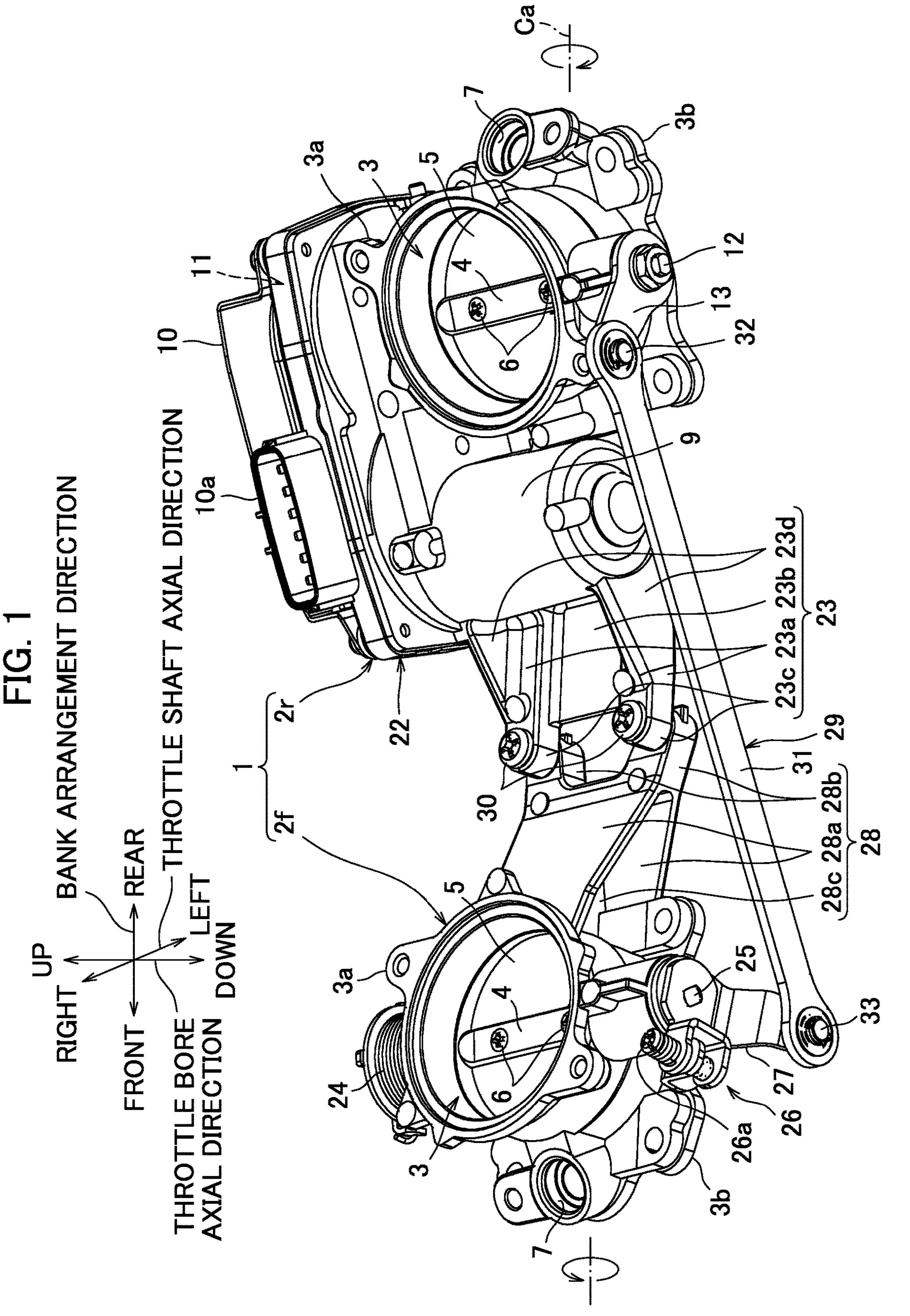
FIG. 1 is a perspective view illustrating a throttle apparatus for an engine according to an embodiment.
Figure 2:
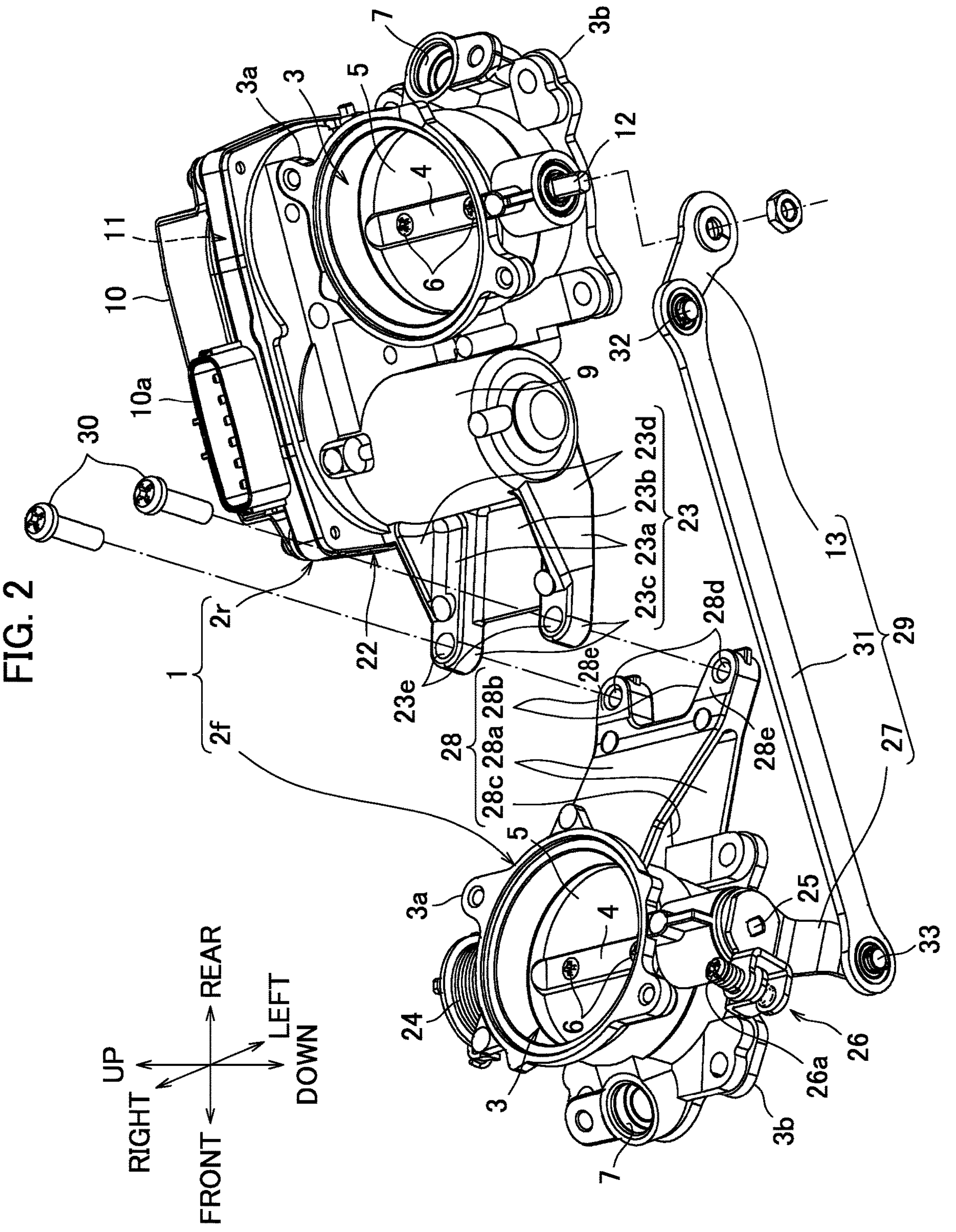
FIG. 2 is an exploded perspective view illustrating the throttle apparatus.
Figure 3:
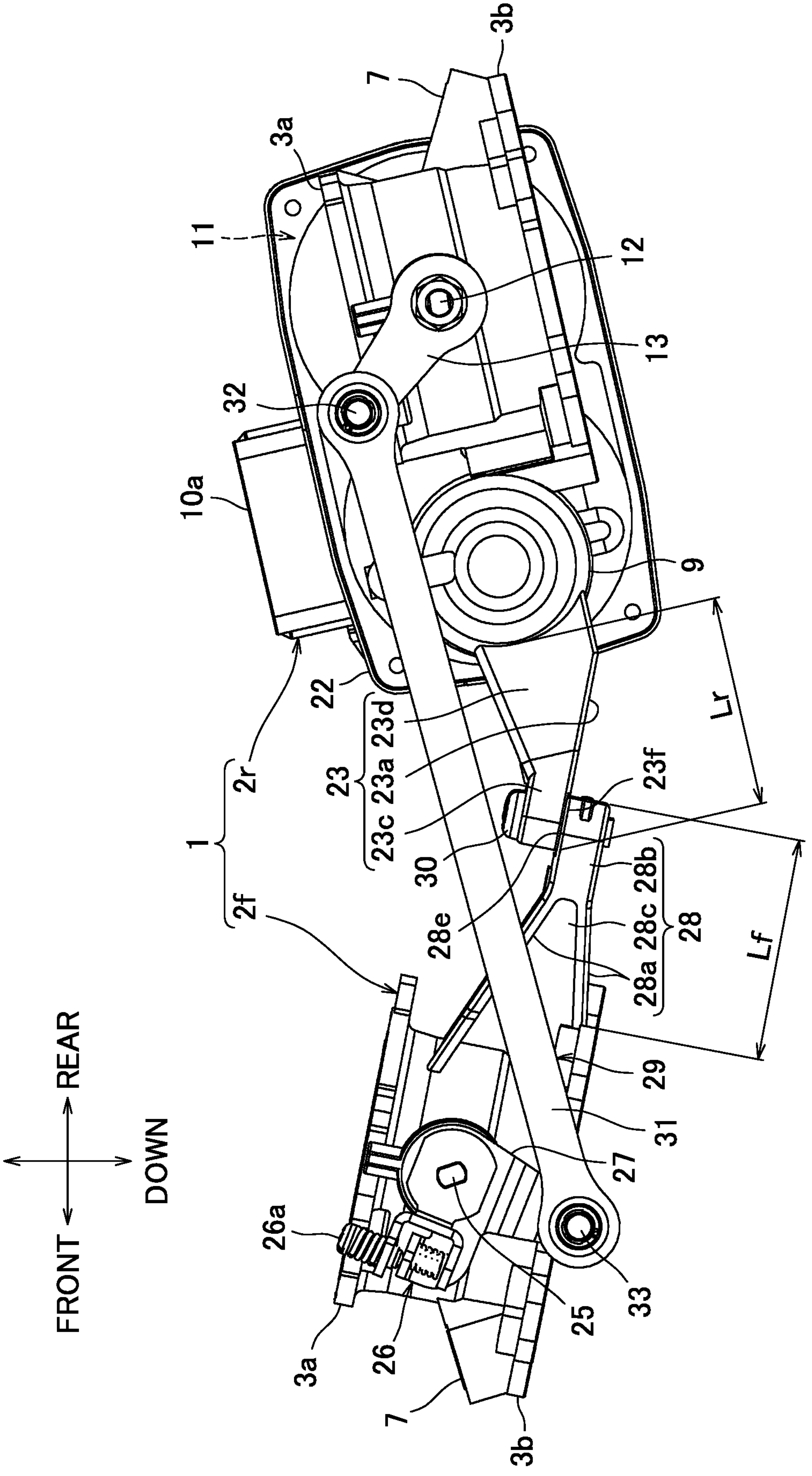
FIG. 3 is a side view illustrating the throttle apparatus.
Figure 4:
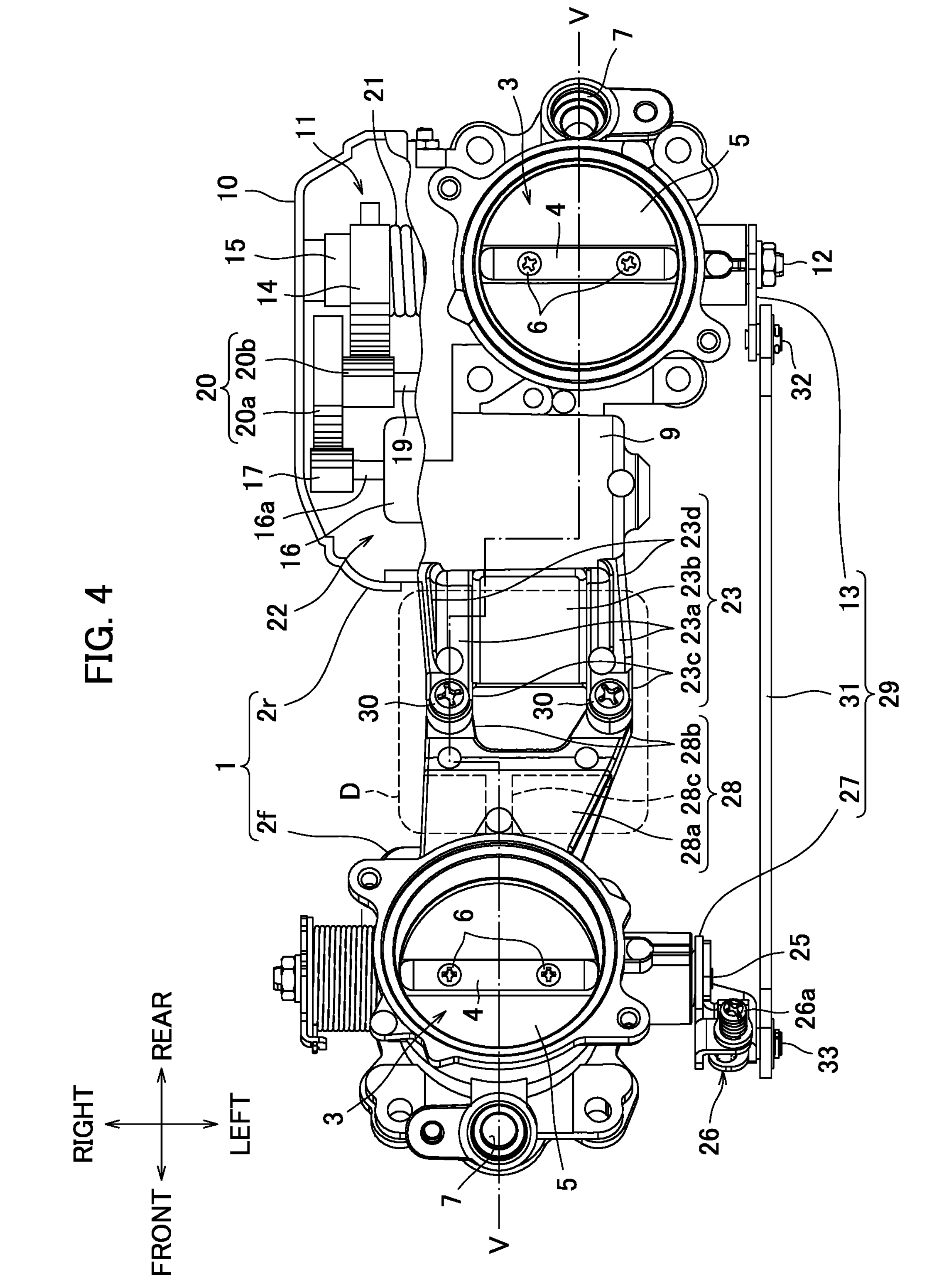
FIG. 4 is a plan view illustrating the throttle apparatus.
Figure 5:
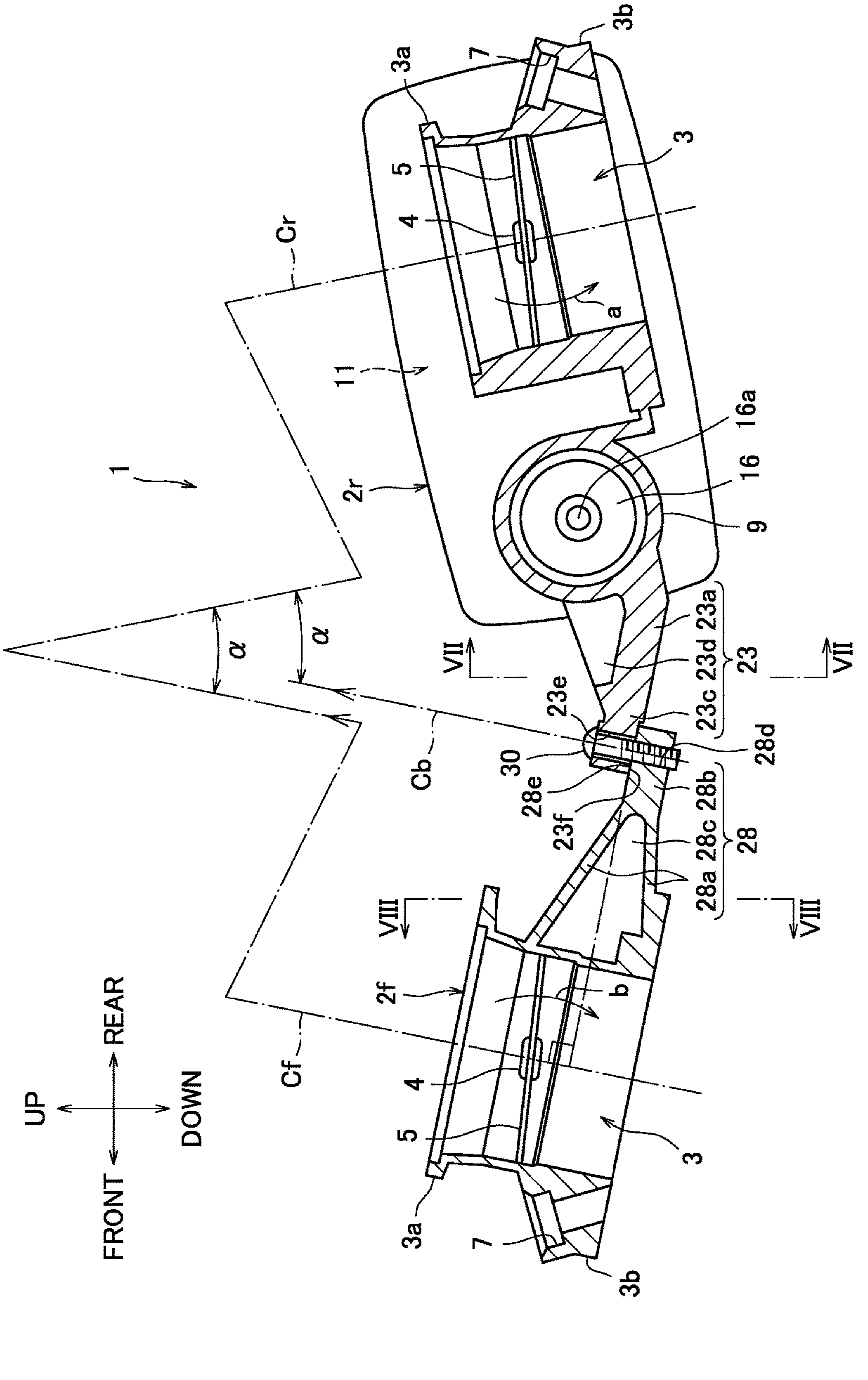
FIG. 5 is a cross-sectional view taken along line V-V in FIG. 4.
Figure 6:
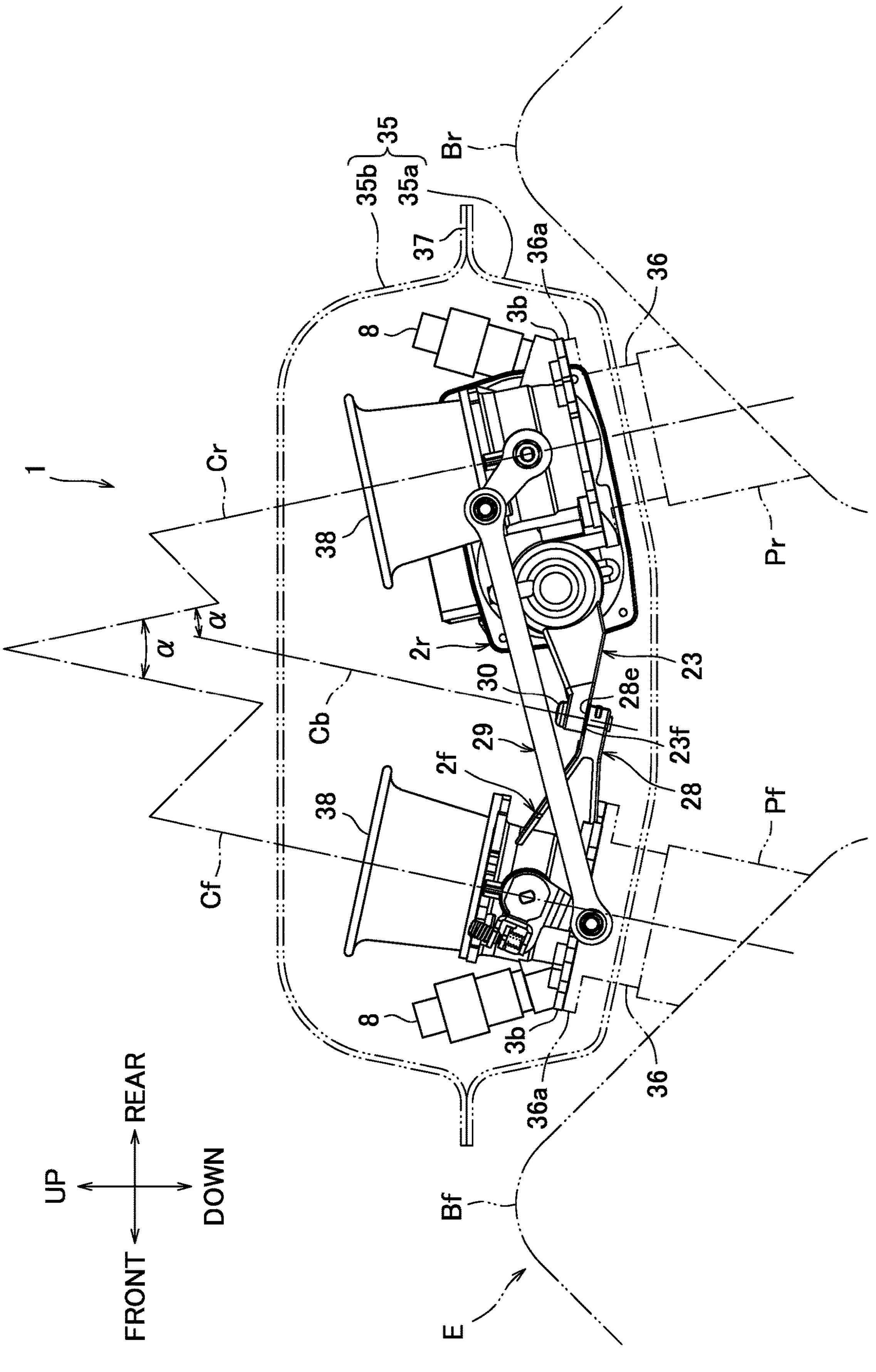
FIG. 6 is an explanatory diagram illustrating a state where the throttle apparatus is mounted on the engine.

FIG. 1 is a perspective view illustrating the throttle apparatus for an engine according to the present embodiment, FIG. 2 is an exploded perspective view, FIG. 3 is a side view, FIG. 4 is a plan view, FIG. 5 is a cross-sectional view taken along line V-V in FIG. 4, and FIG. 6 is an explanatory diagram illustrating a state where the throttle apparatus is mounted on the engine.

A throttle apparatus 1 according to the present embodiment is mounted on a V-type two-cylinder engine E illustrated in FIG. 6, and the engine E is mounted on an unillustrated motorcycle. In the following description, a front-rear direction, a right-left direction, and an up-down direction are defined based on a driver on the motorcycle, and for example, banks Bf and Br of the engine E are provided side by side in the front-rear direction.

In particular, as illustrated in FIGS. 1, 2, and 5, the throttle apparatus 1 is obtained by coupling a front throttle body **2*f* corresponding to a sub-throttle body of the present invention and a rear throttle body 2*r* corresponding to a main throttle body of the present invention. Each of the throttle bodies 2*f* and 2*r* is fabricated by, for example, injection molding using aluminum as a material. In a state where the throttle bodies 2*f* and 2*r* are mounted on the engine E, the throttle bodies 2*f* and 2*r* are disposed side by side in an arrangement direction of the pair of front and rear banks Bf and Br, between the banks Bf and Br. One throttle bore 3 is provided in the up-down direction in each of the front and rear throttle bodies 2*f* and 2*r*, and upper and lower flange portions 3*a* and 3*b* for connection are provided at an upper end and a lower end of each of the throttle bodies 2*f* and 2*r***.

Each of the throttle bodies **2*f* and 2*r* includes a throttle shaft 4 that penetrates through the corresponding throttle bore 3 in the right-left direction and is turnably supported by unillustrated bearings. The throttle shafts 4 of the throttle bodies 2*f* and 2*r* are parallel to each other. In each of the throttle bores 3, a throttle valve 5 is fixed to the throttle shaft 4 by screws 6, and the throttle valve 5 is opened/closed with turning of the throttle shaft 4**.

As a result, an axial direction of the throttle shafts 4 corresponding to the right-left direction is orthogonal to each of the arrangement direction of the banks Bf and Br corresponding to the front-rear direction and an axial direction of the throttle bores 3 corresponding to the up-down direction. The orthogonal state corresponds to "intersection" of the present invention; however, the intersection is not limited to the orthogonal state, and the present invention also includes a case of intersection at an angle other than 90 degrees.

The reason why the front and rear throttle bodies **2*f* and 2*r*** are separately provided is as follows.

As illustrated in FIG. 6, intake pipes Pf and Pr of the respective banks Bf and Br of the V-type engine E are separated in the front-rear direction. Therefore, when the throttle bodies **2*f* and 2*r* are integrated, a mold for injection molding is upsized, which causes problems in terms of a cost and the like. Further, although details are described below, in a side view along the throttle shafts 4, the front and rear throttle bores 3 are inclined at different angles by following inclination angles of the intake pipes Pf and Pr of the banks Bf and Br. Therefore, to collectively form these portions by injection molding, the mold is complicated. To avoid such a problem, the throttle bodies 2*f* and 2*r*** are separately formed by injection molding.

First, the rear throttle body **2*r*** is described.

As illustrated in FIGS. 2, 4, and 5, an injector mounting hole 7 is opened and formed on a rear side of the throttle bore 3 of the rear throttle body **2*r*, and an injector 8 (illustrated in FIG. 6) is mounted on the injector mounting hole 7. A motor housing chamber 9 is integrally formed on a front side of the throttle bore 3 to be adjacent to the throttle bore 3. A gear cover 10 including a connector 10*a* is detachably mounted on a right side of the throttle bore 3 and the motor housing chamber 9, and a gear housing chamber 11 is demarcated inside the gear cover 10. A left end of the throttle shaft 4 protrudes as a driving protrusion end 12 leftward from the rear throttle body 2*r*, and a base end of a driving lever 13 is fixed to the driving protrusion end 12. A right end of the throttle shaft 4 protrudes in the gear housing chamber 11, and a driven gear 14 is fixed to the right end of the throttle shaft 4. A throttle sensor 15 is provided on the driven gear 14 to detect an opening degree of the throttle valve 5. The motor housing chamber 9 has a cylindrical shape along the throttle shaft 4. An output shaft 16***a* of a motor 16 housed inside the motor housing chamber 9 protrudes in the gear housing chamber 11, and a driving gear 17 is fixed to the output shaft 16*a*.

An intermediate gear 20 is rotatably supported by a gear shaft 19 inside the gear housing chamber 11, a large-diameter portion 20*a* of the intermediate gear 20 engages with the driving gear 17, and a small-diameter portion 20*b* of the intermediate gear 20 engages with the driven gear 14. A return spring 21 is wound around the throttle shaft 4, and urges the throttle valve 5 together with the throttle shaft 4 in a closing direction, namely, in a counterclockwise direction indicated by an arrow a in FIG. 5. When the motor 16 forwardly or reversely rotates, the rotation is decelerated through the driving gear 17, the large-diameter portion 20*a* and the small-diameter portion 20*b* of the intermediate gear 20, and the driven gear 14, and the decelerated rotation is transmitted to the throttle shaft 4. The throttle shaft 4 turns while receiving urging force of the return spring 21, to open/close the throttle valve 5. The motor 16 and the gears 14, 17, and 20 described above constitute a motor unit 22.

Although not illustrated, in a state where the throttle apparatus 1 is mounted on a vehicle, a harness extending from a controller on a vehicle body side is connected to the connector 10*a* of the gear cover 10, and the motor 16 and the throttle sensor 15 are conducted with the controller. The controller drives and controls the motor 16 based on a target throttle opening degree calculated from a throttle operation amount by the driver and the throttle opening degree and the like, thereby opening/closing the throttle valve 5 as described above.

Figure 7:
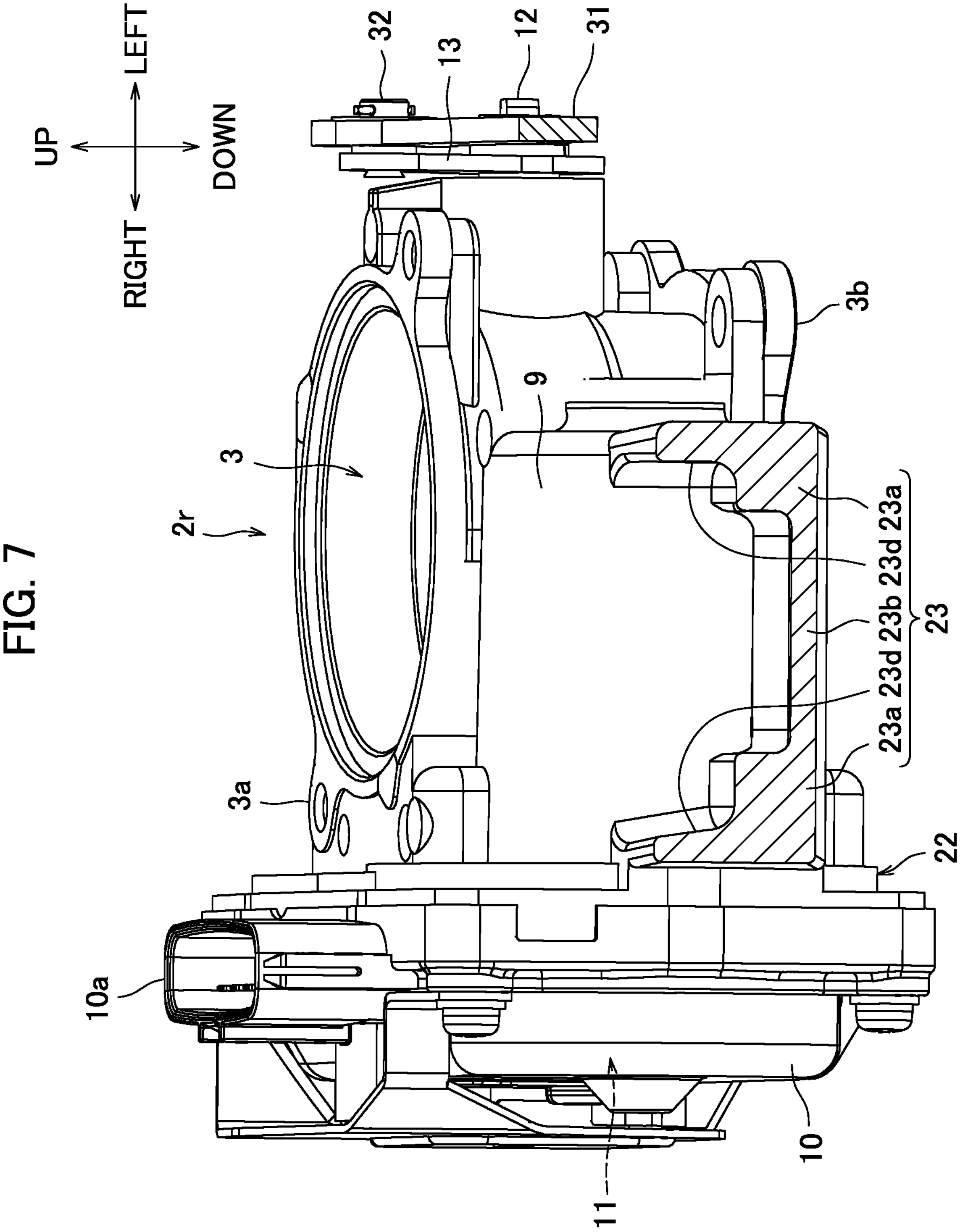
FIG. 7 is a cross-sectional view taken along line VII-VII in FIG. 5.

FIG. 7 is a cross-sectional view taken along line VII-VII in FIG. 5.

As illustrated in FIGS. 2, 5, and 7, a rear coupling portion 23 is integrally formed on a front side of the motor housing chamber 9 of the rear throttle body 2*r*, and the rear coupling portion 23 has a shape protruding forward from the motor housing chamber 9. More specifically, the rear coupling portion 23 is obtained by integrally forming a pair of right and left base portions 23*a*, a connection portion 23*b*, a pair of right and left abutting portions 23*c*, and a pair of right and left ribs 23*d*. The base portions 23*a* extend forward from two positions that are separated in the right-left direction on an outer peripheral surface of the motor housing chamber 9, and are connected to each other by the connection portion 23*b* having a plate shape. The abutting portions 23*c* are provided at front ends of the respective base portions 23*a*. Screw holes 23*e* are provided in the respective abutting portions 23*c* in the up-down direction, and flat lower surfaces of the respective abutting portions 23*c* serve as abutting surfaces 23*f*.

The ribs 23*d* are provided on the respective base portions 23*a*, and each have a triangular shape in which a vertical width is gradually reduced from the motor housing chamber 9 toward the corresponding abutting portion 23*c*. Upper surfaces of the base portions 23*a* and the outer peripheral surface of the motor housing chamber 9 are connected by these ribs 23*d*. In the side view along the throttle shaft 4, the rear coupling portion 23 has a shape tapered from the motor housing chamber 9 to the abutting portions because of the shapes of the ribs 23*d*. A dimension from the rear throttle body 2*r* to each of the abutting portions 23*c*, more specifically, a dimension from the motor housing chamber 9 to each of the abutting portions 23*c* is set to Lr.

Next, the front throttle body 2*f* is described.

As illustrated in FIGS. 2, 4, and 5, the injector mounting hole 7 is opened and formed on a front side of the throttle bore 3 of the front throttle body 2*f*, and the injector 8 (illustrated in FIG. 6) is mounted on the injector mounting hole 7. A right end of the throttle shaft 4 penetrating through the throttle bore 3 protrudes rightward from the front throttle body 2*f*. A return spring 24 is wound around the right end of the throttle shaft 4, and urges the throttle valve 5 together with the throttle shaft 4 in a closing direction, namely, in a clockwise direction indicated by an arrow b in FIG. 5. A left end of the throttle shaft 4 protrudes as a driven protrusion end 25 leftward from the front throttle body 2*f*, and a base end of a driven lever 27 is attached to the driven protrusion end 25 through an adjuster mechanism 26.

A configuration of the adjuster mechanism 26 is not described in detail because of being well known. The adjuster mechanism 26 exerts a function of transmitting turning of the driven lever 27 around the base end to the throttle shaft 4, and adjusting a relative angle between the driven lever 27 and the throttle shaft 4 based on adjustment of an adjuster screw 26*a*. Full-open positions of the front and rear throttle valves 5 are synchronized by the adjuster mechanism 26 as described below.

Figure 8:
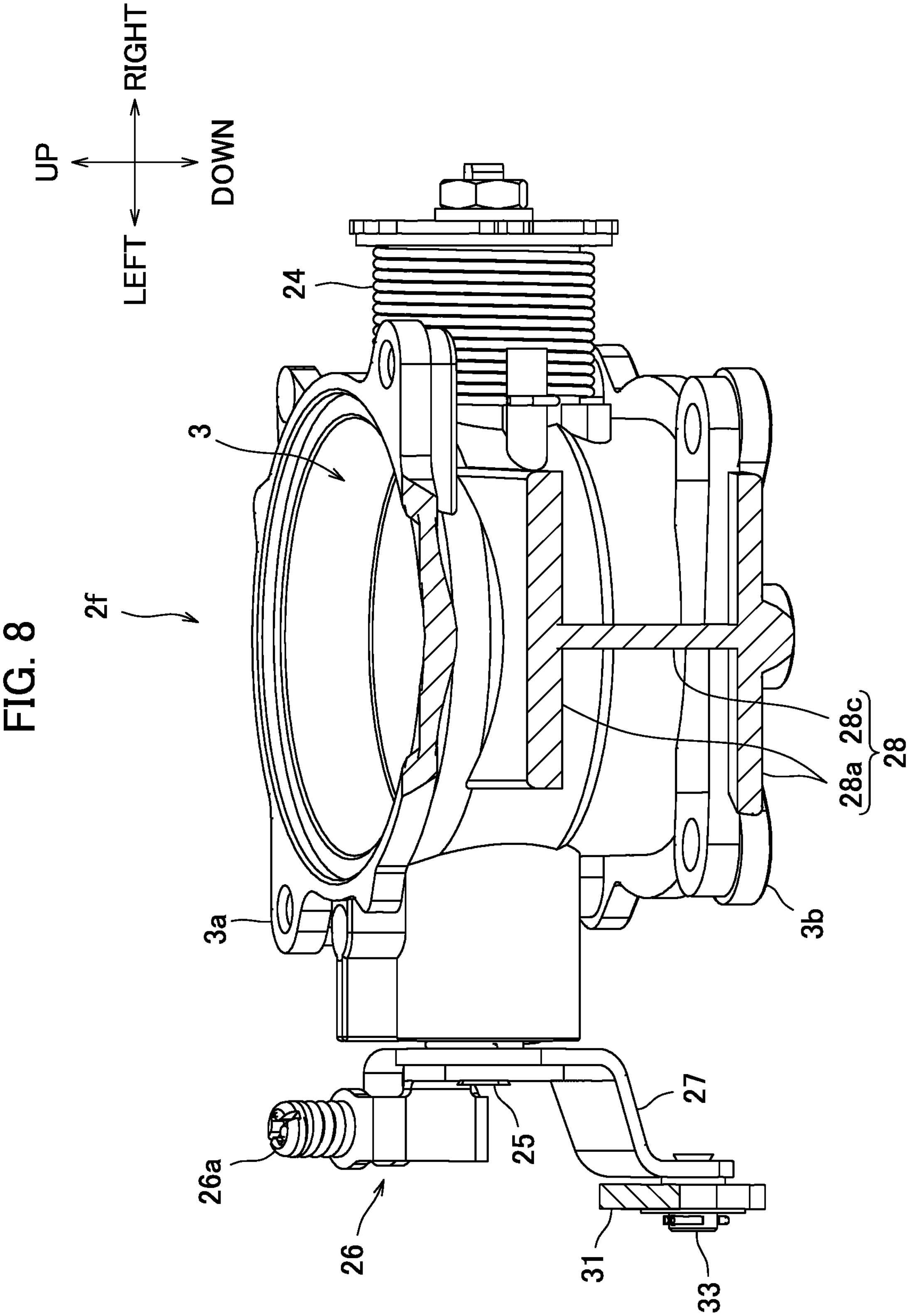
FIG. 8 is a cross-sectional view taken along line VIII-VIII in FIG. 5.

FIG. 8 is a cross-sectional view taken along line VIII-VIII in FIG. 5. As illustrated in FIGS. 2, 5, and 8, a front coupling portion 28 is integrally formed on a rear side of the front throttle body 2*f*, and the front coupling portion 28 has a shape protruding rearward from the front throttle body 2*f*. As described above, the rear coupling portion 23 has the shape protruding forward. As a result, the coupling portions 23 and 28 extend in a direction approaching each other. The front coupling portion 28 is obtained by integrally forming a pair of upper and lower base portions 28*a*, a pair of right and left abutting portions 28*b*, and a rib 28*c*. The base portions 28*a* extend forward from two positions that are separated in the up-down direction on an outer peripheral surface of the front throttle body 2*f*, to gradually come close to each other. Front ends of the base portions 28*a* are connected to each other, and the abutting portions 28*b* are provided at two positions that are separated from each other in the right-left direction. Female screw holes 28*d* are provided in the respective abutting portions 28*b* in the up-down direction, and flat upper surfaces of the respective abutting portions 28*b* serve as abutting surfaces 28*e*.

As a result, a space having a triangular shape in the side view along the throttle shaft 4 is formed between the base portions 28*a*, and the rib 28*c* having a triangular shape is provided inside the space. As illustrated by a dashed line in FIG. 4, the rib 28*c* is positioned at substantially center of the base portions 28*a* in the right-left direction. In the side view along the throttle shaft 4, the front coupling portion 28 has a shape tapered from the front throttle body 2*f* to the abutting portions 28*b* because of arrangement of the base portions 28*a* sandwiching the rib 28*c* as described above. A dimension Lf from the front throttle body 2*f* to the abutting portions 28*b* is set to be substantially equal to the dimension Lr of the rear coupling portion 23.

As illustrated in FIG. 4, the throttle bores 3 of the front and rear throttle bodies 2*f* and 2*r* are shifted in the right-left direction, corresponding to the right-left positions of the banks Bf and Br of the engine E. Accordingly, the base portions 28*a* of the front coupling portion 28 each have a trapezoidal shape in a plan view, corresponding thereto.

The front and rear throttle bodies 2*f* and 2*r* as described above are coupled to each other through the front and rear coupling portions 28 and 23, and the throttle shafts are connected to each other through a link mechanism 29 described below. As a result, the throttle apparatus 1 is configured.

More specifically, as illustrated in FIGS. 2 and 5, the abutting surfaces 23*f* of the rear coupling portion 23 are superimposed on the respective abutting surfaces 28*e* of the front coupling portion 28, the right and left female screw holes 28*d* and the right and left screw holes 23*e* are aligned with each other, and screws 30 are inserted into the respective screw holes 23*e* from above and are screwed into the respective female screw holes 28*d*. As a result, the front and rear coupling portions 28 and 23 are fastened to each other, thereby coupling the throttle bodies 2*f* and 2*r*. Each of the screws 30 corresponds to a "fastening member" of the present invention.

As described above, the dimensions Lf and Lr of the coupling portions 28 and 23 are set to be substantially equal to each other. Therefore, the abutting portions 28*b* and 28*c* are superimposed and fastened with the screws 30 at substantially center between the front and rear throttle bodies 2*f* and 2*r* in the front-rear direction, and the front and rear throttle bodies 2*f* and 2*r* are maintained at desired positional relationship through such coupling portions 28 and 23.

As illustrated in FIG. 3, in a state where the throttle valves 5 are closed, a rear end of a rod 31 is turnably connected to a front end of the driving lever 13 directed upward, through a pin 32, and a front end of the rod 31 is turnably connected to a front end of the driven lever 27 directed downward, through a pin 33, which constitute the link mechanism 29. Therefore, when the throttle shaft 4 turns by driving of the motor 16 on the rear throttle body 2*r* side, turning of the driving protrusion end 12 is transmitted to the driven protrusion end 25 through the link mechanism 29, and the throttle shaft 4 on the front throttle body 2*f* side accordingly turns in an opposite direction. As a result, the throttle valves 5 are opened/closed in synchronization with each other. The link mechanism 29 according to the present embodiment corresponds to an "interlocking mechanism" of the present invention.

Next, a state where the throttle apparatus 1 is mounted on the engine E is described with reference to FIG. 6.

The throttle apparatus 1 is mounted on the banks Bf and Br of the engine E while being housed in an air cleaner box 35. A lower casing 35*a* of the air cleaner box 35 has a shape opening upward, and a pair of right and left attachments 36 each having a cylindrical shape are fixed to a bottom surface of the lower casing 35*a*. The attachments 36 protrudes downward from the lower casing 35*a* and open, and are connected to the respective intake pipes Pf and Pr of the banks Bf and Br of the engine E. The lower flange portions 3*b* of the front and rear throttle bodies 2*f* and 2*r* are fastened to flange portions 36*a* integrally formed on upper parts of the respective attachments 36, with unillustrated bolts. Thus, the throttle apparatus 1 is mounted, and the throttle bores 3 of the front and rear throttle bodies 2*f* and 2*r* communicate with insides of cylinders of the respective corresponding banks Bf and Br through the attachments 36.

An upper casing 35*b* having a shape opening downward is disposed on an upper side of the lower casing 35*a*, and peripheries of the lower casing 35*a* and the upper casing 35*b* are fastened to each other with unillustrated screws while sandwiching a packing. Thus, the throttle apparatus 1 is housed inside the air cleaner box 35. Funnels 38 are fixed to the upper flange portions 3*a* of the front and rear throttle bodies 2*f* and 2*r* with unillustrated screws, and the throttle bores 3 of the throttle bodies 2*f* and 2*r* communicate with an inside of the air cleaner box 35 through the respective funnels 38.

An unillustrated air cleaner is connected to one side of the air cleaner box 35. During operation of the engine E, intake air filtered by the air cleaner flows into the air cleaner box 35. The intake air flows through the throttle bores 3 of the front and rear throttle bodies 2*f* and 2*r* from the funnels 38, and a flow rate of the intake air is adjusted based on the opening degrees of the throttle valves 5. Along therewith, fuel is injected into the intake air from the injectors 8, and mixed gas flows into the cylinders of the banks Bf and Br through the attachments 36 and the intake pipes Pf and Pr, and is supplied for combustion.

As illustrated in FIG. 6, the intake pipes Pf and Pr of the banks Bf and Br of the engine E according to the present embodiment open while being inclined at different angles in the side view along the throttle shafts 4. Therefore, axes Cf and Cr of the front and rear throttle bores 3 communicating with respective openings of the intake pipes Pf and Pr are also inclined at different angles in the side view. Thus, shapes and the like of the front and rear coupling portions 28 and 23 in the side view are set to maintain postures of the front and rear throttle bodies 2*f* and 2*r* realizing such positional relationship of the throttle bores 3, and details thereof are described below.

As illustrated in FIGS. 5 and 6, in the side view, an angle α is formed between the axis Cf of the front throttle bore 3 and the axis Cr of the rear throttle bore 3. The abutting portions 28*b* of the front coupling portion 28 and the abutting portions 23*c* of the rear coupling portion 23 are fastened with the screws 30 while the abutting surfaces 28*e* and 23*f* are superimposed on each other, and the abutting surfaces 28*e* and 28*f* are perpendicular to the axis Cf of the throttle bore 3 of the front throttle body 2*f*. The female screw holes 28*d* and the screw holes 23*e* are provided in a direction orthogonal to the abutting surfaces 28*e* and 23*f*. Therefore, an axis Cb of the abutting surfaces 28*e* and 28*f* is parallel to the axis Cf of the throttle bore 3 of the front throttle body 2*f* in the side view, and forms an angle α to the axis Cr of the throttle bore 3 of the rear throttle body 2*r*. As a result, the female screw holes 28*d* are provided to be parallel to the axis Cf of the throttle bore 3 of the front throttle body 2*f* in which the female screw holes 28*d* themselves are provided.

Next, a procedure of assembling the throttle apparatus 1 to the engine E is described.

The throttle apparatus 1 according to the present embodiment is collectively assembled to the engine E after the front and rear throttle bodies 2*f* and 2*r* are connected and assembled to each other. First, the front and rear throttle bodies 2*f* and 2*r* are individually assembled, and are set on unillustrated jigs. The front and rear throttle bodies 2*f* and 2*r* are maintained at the desired positional relationship illustrated in FIGS. 3 and 4. The abutting surfaces 23*f* of the rear coupling portion 23 are superimposed on the respective abutting surfaces 28*e* of the front coupling portion 28, and the female screw holes 28*d* of the front coupling portion 28 and the screw holes 23*e* of the rear coupling portion 23 are aligned with each other. When the screws 30 are inserted into the screw holes 23*e* from above and are screwed into the female screw holes 28*d*, the front and rear coupling portions 28 and 23 are fastened to each other, and the throttle bodies 2*f* and 2*r* are coupled at the desired positional relationship.

Thereafter, when the front end of the driving lever 13 and the front end of the driven lever 27 are connected through the rod 31, the throttle apparatus 1 is assembled, and becomes operable as a single body separated from the engine E. Accordingly, full-close positions of the throttle valves 5 can be adjusted and synchronized with each other by the adjuster mechanism 26. When the throttle apparatus 1 is fixed, with bolts, to the attachments 36 of the lower casing 35*a* previously mounted on the engine E, and the upper casing 35*b* is mounted, assembly of the throttle apparatus 1 to the engine E is completed.

As described above, in the present embodiment, the front and rear throttle bodies 2*f* and 2*r* are coupled through the front and rear coupling portions 28 and 23. This makes it possible to assemble the throttle apparatus 1 as a single body. Thus, in this state, the full-close positions of the throttle valves 5 can be adjusted by the adjuster mechanism 26 separately from the engine E. Accordingly, for example, as compared with a case where the full-close positions of the throttle valves 5 are adjusted while the throttle apparatus 1 is mounted on the engine E, the adjustment work can be more easily and rapidly performed.

In addition, the assembled throttle apparatus 1 can be collectively assembled to the engine E. Accordingly, for example, as compared with a case where the front and rear throttle bodies 2*f* and 2*r* are individually assembled to the engine E, the assembly work can be more easily and rapidly performed. In particular, in a case where the engine E is already mounted on the vehicle body, it is necessary to assemble the throttle apparatus 1 while avoiding parts of the vehicle body positioned on the periphery; however, even in such a case, the assembly work can be more easily and rapidly performed by collective assembly of the assembled throttle apparatus 1.

Since the assembled front and rear throttle bodies 2*f* and 2*r* are supported from the engine E side, and are connected to each other through the front and rear coupling portions 28 and 23 as well, assembling rigidity to the engine E is improved. This makes it possible to prevent trouble such as failure of the throttle apparatus 1 caused by vibration applied from the engine E. If the assembling rigidity is insufficient, an error may occur on the full-close positions of the throttle valves 5 due to relative positional displacement of the throttle bodies 2*f* and 2*r*; however, such a circumstance can be prevented, and reliability of the throttle apparatus 1 can be improved.

The following factors contribute to the above-described assembling rigidity to the engine E.

The abutting portions 28*b* and 28*c* are formed at two positions that are separated in the right-left direction, of the front and rear coupling portions 28 and 23, and the abutting portions 28*b* and 23*c* are fastened to each other with the screws 30. Therefore, for example, even in a case where force in a twisting direction around a virtual axis Ca illustrated by an arrow in FIG. 1 acts on each of the throttle bodies 2*f* and 2*r*, relative positional displacement can be effectively prevented, which makes it possible to further improve the assembling rigidity to the engine E.

In the side view along the throttle shafts 4, the front coupling portion 28 has the shape tapered from the front throttle body 2*f* to the abutting portions 28*b*, and the rear coupling portion 23 has the shape tapered from the rear throttle body 2*r* to the abutting portions 23*c*. Even in a case where force in any direction acts on each of the throttle bodies 2*f* and 2*r*, large stress occurs on sides closer to the base ends than the front ends of the coupling portions 28 and 23, namely, on the throttle bodies 2*f* and 2*r* side. In other words, the stress is reduced toward the front end sides of the coupling portions 28 and 23. Therefore, strength required for the coupling portions 28 and 23 is reduced. The front and rear coupling portions 28 and 23 are each formed in the tapered shape based on difference of the stress, which makes it possible to reduce the weights of the coupling portions 28 and 23, and accordingly makes it possible to reduce the weight of the throttle apparatus 1 while the essential coupling function by the coupling portions 28 and 23 is maintained.

In addition, the coupling portions 28 and 23 are each formed in the tapered shape due to formation of the triangular ribs 28*c* and 23*d*. Therefore, as compared with a case where solid coupling portions 28 and 23 are formed, further reduction of the weight can be achieved without largely reducing the strength.

Since the dimension Lf of the front coupling portion 28 from the front throttle body 2*f* to the abutting portions 28*b* and the dimension Lr of the rear coupling portion 23 from the rear throttle body 2*r* to the abutting portions 23*c* are set to be substantially equal to each other, the front and rear throttle bodies 2*f* and 2*r* are fastened to each other at substantially center between the front and rear throttle bodies 2*f* and 2*r*. For example, in a case where the dimensions Lf and Lr are not equal to each other, it is necessary to take inefficient strength measures such as extreme increase in thickness of the coupling portion of the throttle body having the larger dimension, in order to resist the high stress occurring on the coupling portion, and a total weight of the coupling portions 28 and 23 is accordingly increased. When the dimensions Lf and Lr are set to be substantially equal to each other, the stress occurring on the coupling portions 28 and 23 are made equal to each other. This makes it possible to secure sufficient strength without increasing the thickness of the coupling portions 28 and 23, which contributes to reduction in weight.

In contrast, since the throttle bores 3 each having a large diameter are provided in the throttle bodies 2*f* and 2*r*, a main demolding direction in the injection molding is set along the axes Cf and Cr of the throttle bores 3. Therefore, parts other than the throttle bores 3 of the throttle bodies 2*f* and 2*r* are also desirably set to shapes demoldable along the axes of the throttle bores 3 for simplification of the mold.

Figure 9:
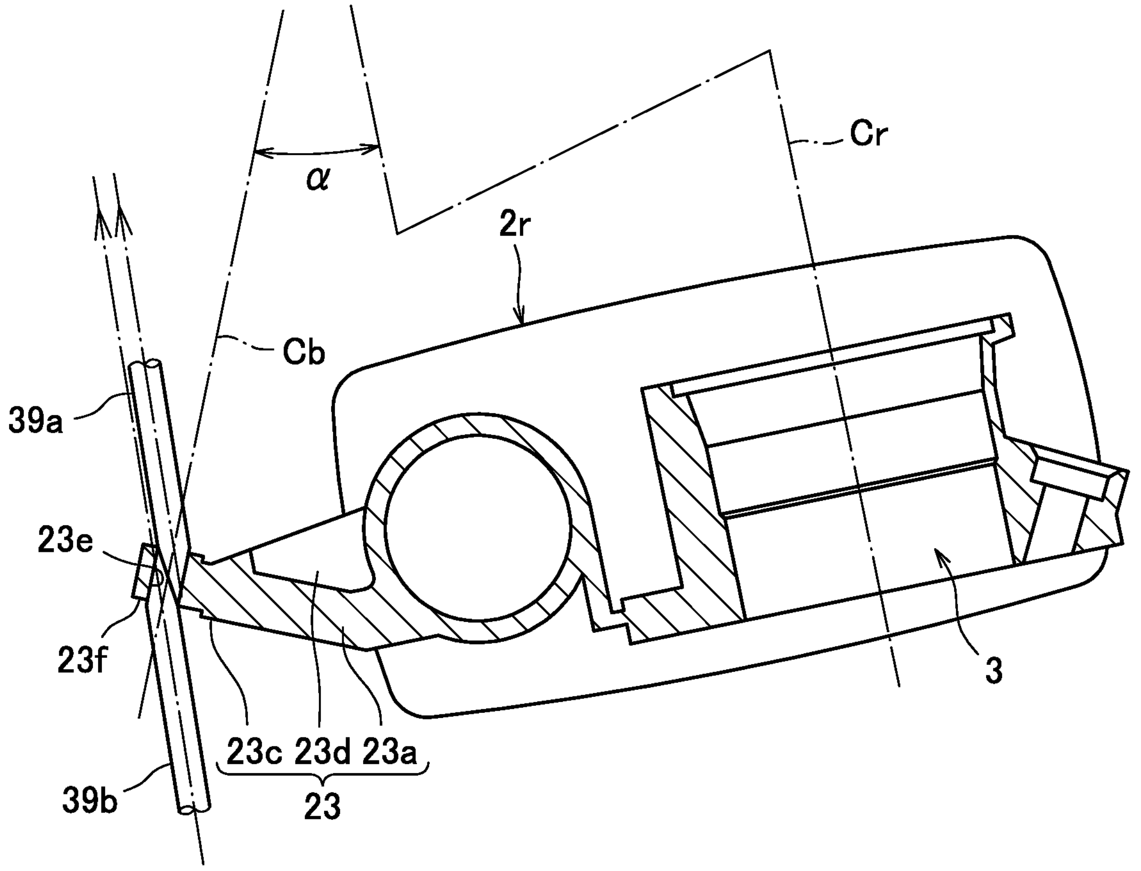
FIG. 9 is an explanatory diagram illustrating core pins for screw holes when a front throttle body is formed by injection molding.

For example, in the rear throttle body 2*r*, the axis Cb of the screw hole 23*e* forms the angle α to the axis Cr of the throttle bore 3 in a side view illustrated in FIG. 9. Therefore, prepared holes of the screw holes 23*e* cannot be demolded together with the throttle bore 3 by a mold having a simple configuration. Thus, core pins 39*a* and 39*b* set in upper and lower molds enable demolding of the screw holes 23*e*. More specifically, the upper and lower core pins 39*a* and 39*b* are disposed in parallel to the axis Cr of the throttle bore 3. When the molds are closed, inclined front ends of the core pins 39*a* and 39*b* abut on each other inside each of the screw holes 23*e*. When molten aluminum is injected into a cavity of the molds in this state, the prepared holes of the screw holes 23*e* are formed by the core pins 39*a* and 39*b*. Thereafter, when the molds are released, the core pins 39*a* and 39*b* are separated in the up-down direction, and demolded from the prepared holes of the screw holes 23*e*.

By the above-described method, the prepared holes of the screw holes 23*e* each forming the angle α different from the axis Cr can be formed together with the throttle bore 3; however, execution of the method is desirably avoided as much as possible because the mold is complicated. Therefore, in the present embodiment, the female screw holes 28*d* of the front coupling portion 28 are formed to be parallel to the axis Cf of the throttle bore 3 of the front throttle body 2*f* in which the female screw holes 28*d* themselves are formed.

Since the screw holes 23*e* of the rear coupling portion 23 each forms the angle α to the axis Cr of the throttle bore 3 of the rear throttle body 2*r*, there is no other way but to form the screw holes 23*e* by the method described with reference to FIG. 9. However, the prepared holes of the female screw holes 28*d* can be simultaneously demolded because of being parallel to the axis of the throttle bore 3. Therefore, in the injection molding of the front throttle body 2*f*, the prepared holes of the female screw holes 28*d* can be formed together with the throttle bore 3 by using a simple mold, and the female screw holes can be formed by subsequent tap processing. In other words, in a case where the prepared holes of the female screw holes 28*d* also each forms an angle to the throttle bore 3 as with the screw holes 23*e*, the method in FIG. 9 is inevitably adopted for formation of any holes, which complicates the molds for the front and rear throttle bodies 2*f* and 2*r*. In contrast, according to the present embodiment, a simple mold is applicable to the front throttle body 2*f*. This achieves an effect of further reducing the manufacturing cost of the throttle apparatus 1 because of simplification of the mold.

In contrast to the above description, the screw holes 23*e* may be provided in the front coupling portion 28, and the female screw holes 28*d* may be provided in the rear coupling portion 23. In this case, in the injection molding of the front throttle body 2*f*, the screw holes 23*e* can be formed together with the throttle bore 3 by using the simple mold. Further, in place of the female screw holes 28*d* of the front coupling portion 28, the screw holes 23*e* of the rear coupling portion 23 may be made parallel to the axis Cr of the throttle bore 3. In this case, in the injection molding of the rear throttle body 2*r*, the screw holes 23*e* can be formed together with the throttle bore 3 by using the simple mold.

In addition to achievement of the above-described advantageous effects, the throttle apparatus 1 according to the present embodiment can achieve advantageous effects described below, as compared with the throttle apparatus in which the throttle bodies are similarly connected, disclosed in Patent Document 1.

The throttle apparatus disclosed in Patent Document 1 has a problem that the weight is increased because the connection plates as members separated from the throttle body are used. More specifically, in the technique disclosed in Patent Document 1, the throttle bodies are connected to each other through the connection plates on the one side and the other side in order to firmly connect the throttle bodies, and each of the connection plates is made of, for example, a steel material having a sufficient thickness. As a result, the two connection plates have a considerable weight. In addition, since the connection plates are members separated from the throttle bodies, it is necessary to overlap both ends of the connection plates with the throttle bodies as margins of fastening. Such extension of the connection plates also causes increase in weight.

In contrast, in the present embodiment, the front and rear coupling portions 28 and 23 are respectively integrally formed with the throttle bodies 2*f* and 2*r*, and respectively extend from the throttle bodies 2*f* and 2*r* in the direction approaching each other. In other words, the front and rear coupling portions 28 and 23 are formed to have the shortest lengths enough to couple the throttle bodies 2*f* and 2*r*. Therefore, when the coupling portions 28 and 23 are additionally provided, the weights of the throttle bodies 2*f* and 2*r* are little increased. Since the coupling portions 28 and 23 are respectively integrally formed with the throttle bodies 2*f* and 2*r*, it is unnecessary to extend the connection plates as the margins of fastening with the throttle bodies unlike the technique disclosed in Patent Document 1, and increase in weight caused thereby is avoidable. This makes it possible to prevent increase in weight caused by the coupling portions 28 and 23 for coupling the throttle bodies 2*f* and 2*r*, and to reduce the weight of the throttle apparatus 1 as compared with the technique disclosed in Patent Document 1.

In the throttle apparatus disclosed in Patent Document 1, the connection plates are disposed on the one side and the other side of the throttle bodies, and one of the connection plates is disposed outside the link mechanism in order to prevent interference with the link mechanism. Such arrangement of the connection plates causes increase in outer dimension of the throttle apparatus in the axial direction of the throttle shafts, and accordingly causes enlargement in occupied space.

In contrast, in the present embodiment, the front and rear coupling portions 28 and 23 are provided in a dead space not used. In other words, the front and rear throttle bodies 2*f* and 2*r* are disposed separately from each other in the front-rear direction corresponding to the intake pipes Pf and Pr of the banks Bf and Br of the engine E, and a dead space D illustrated by a dashed line in FIG. 4 is formed therebetween. The front and rear coupling portions 28 and 23 respectively extending from the throttle bodies 2*f* and 2*r* in the direction approaching each other are disposed in such a dead space D. As a result of being disposed in the dead space D, the front and rear coupling portions 28 and 23 are separated rightward from the link mechanism 29 positioned on the left side of the throttle bodies 2*f* and 2*r*, and are prevented from interfering with the link mechanism 29. Accordingly, the coupling portions 28 and 23 can be respectively additionally provided on the throttle bodies 2*f* and 2*r* without increasing the outer dimension of the throttle apparatus 1 in all directions including the axial direction of the throttle shafts 4. This makes it possible to reduce the space occupied by the throttle apparatus 1 when the throttle apparatus 1 is mounted on the vehicle.

In the throttle apparatus disclosed in Patent Document 1, it is necessary to perform operation of fastening the screws from different directions at least four positions in total on the one side and the other side of the throttle bodies, in order to connect the throttle bodies through the connection plates. Thus, it is hard to say that assembling easiness is excellent. In addition, labor and a material cost are required to fabricate the two connection plates. These factors cause increase in manufacturing cost.

In contrast, in the present embodiment, the coupling portions 28 and 23 are automatically formed in the injection molding of the front and rear throttle bodies 2*f* and 2*r*. Therefore, labor and a material cost required to fabricate the connection plates disclosed in Patent Document 1 can be eliminated, and labor required to perform operation of fastening the connection plates becomes unnecessary. In the present embodiment, in place of the operation of fastening the connection plates, it is necessary to fasten the front and rear coupling portions 28 and 23 with the pair of right and left screws 30; however, the number of fastening portions is reduced as a whole, and the screws 30 can be fastened from the above in the same direction. This makes it possible to realize excellent assembling easiness. These factors cause reduction in manufacturing cost as compared with the technique disclosed in Patent Document 1.

The mode of the present invention is not limited to the embodiment. For example, the above-described embodiment is embodied in the throttle apparatus 1 for a V-type two-cylinder engine mounted on a motorcycle; however, the embodiment is not limited thereto. A vehicle type to which the throttle apparatus 1 is applied, the number of cylinders of the engine, and the like are optionally changeable as long as the throttle apparatus is a throttle apparatus for a V-type engine. Accordingly, the throttle apparatus 1 may be embodied as a throttle apparatus for an engine mounted on an all terrain vehicle (ATV) such as a four-wheel buggy, or the number of cylinders of a target engine may be changed to four or six. For example, in a case of a four-cylinder engine, the front throttle bodies **2*f* according to the above-described embodiment are provided on a right side and a left side and integrated, and the rear throttle bodies 2*r* according to the above-described embodiment are provided on the right side and the left side and integrated. In addition, the coupling portions 28 and 23 extending in the direction approaching each other from the throttle bodies 2*f* and 2*r*** on each of the right side and the left side are fastened with each other.

In the above-described embodiment, the throttle valve 5 of the rear throttle body **2*r* is opened/closed by the motor unit 22 provided on the rear throttle body 2*r*, and turning of the throttle shaft 4 at this time is transmitted to the throttle shaft 4 of the front throttle body 2*f* through the link mechanism 29 to open/close the throttle valve 5 of the front throttle body 2*f*; however, the configuration is not limited thereto. For example, the motor unit 22 may be provided on each of the throttle bodies 2*f* and 2*r*, and the throttle valves 5** may be independently opened/closed.

In the above-described embodiment, as the interlocking mechanism, the link mechanism 29 including the levers 13 and 27 and the rod 31 is adopted; however, the interlocking mechanism is not limited thereto. For example, turning of one of the throttle shafts 4 may be transmitted to the other throttle shaft 4 through a gear train.

In the above-described embodiment, the axes Cf and Cr of the front and rear throttle bores 3 are inclined at different angles in the side view; however, the configuration is not limited thereto. For example, the axes Cf and Cr may be made parallel to each other.

REFERENCE SIGNS LIST

1 Throttle apparatus
**2*f*** Front throttle body (sub-throttle body)
**2*r*** Rear throttle body (main throttle body)
3 Throttle bore
4 Throttle shaft
5 Throttle valve
12 Driving protrusion end
16 Motor
22 Motor unit
23 Rear coupling portion
**23*c*, 28*b*** Abutting portion
**23*d*, 28*c*** Rib
**23*e*** Screw hole
25 Driven protrusion end
28 Front coupling portion
**28*d*** Female screw hole
29 Link mechanism (interlocking mechanism)
30 Screw (fastening member)
E Engine
Bf, Br Bank

What is claimed is:

1. A throttle apparatus for an engine, comprising:

a pair of throttle bodies disposed side by side in an arrangement direction of a pair of banks constituting a V-type engine, between the banks;

a pair of throttle bores provided in the respective throttle bodies, and configured to guide intake air into cylinders of the pair of banks;

a pair of throttle valves supported to be openable/closable inside the respective throttle bores, by a pair of throttle shafts, the pair of throttle shafts each intersecting the arrangement direction of the banks and an axial direction of the throttle bores and being parallel to each other;

a pair of coupling portions provided integrally with the respective throttle bodies and extending in a direction approaching each other, and configured to couple the pair of throttle bodies by being fastened at abutting portions superimposed on each other with fastening members, wherein one of the pair of throttle bodies is a main throttle body having, as a driving protrusion end, one end of one corresponding of the throttle shafts protruding outside, and the other of the pair of throttle bodies is a sub-throttle body having, as a driven protrusion end, one end of the other of the throttle shafts protruding outside;

a motor unit, which is connected to the other end of the throttle shaft of the main throttle body, and opens/closes the throttle valve through the throttle shaft by using a motor as a driving source;

an interlocking mechanism, which is provided between the driving protrusion end and the driven protrusion end, and transmits turning of the driving protrusion end to the driven protrusion end; and a motor housing chamber, which houses the motor, is integrally formed with the main throttle body, wherein base portions of the coupling portions extend from two positions that are separated in the right-left direction on an outer peripheral surface of the motor housing chamber, each of the respective base portions provided with a rib having a triangular shape in which a vertical width is gradually reduced from the motor housing chamber thereby providing each of the coupling portions with a tapered shape.

2. The throttle apparatus for an engine according to claim 1, wherein one of the pair of coupling portions includes the abutting portions at two positions separated in an axial direction of the throttle shaft, and includes screw holes provided in the respective abutting portions, the other of the pair of coupling portions includes the abutting portions at two positions separated in the axial direction of the other of the throttle shafts, and includes female screw holes provided in the respective abutting portions, and the fastening members are a pair of screws screwed into the respective female screw holes through the screw holes from one direction.

3. The throttle apparatus for an engine according to claim 2, wherein axes of the pair of throttle bores are inclined at different angles in a side view along the throttle shafts, and the screw holes or the female screw holes are provided to be parallel to the axis of the throttle bore of the throttle body in which the screw holes or the female screw holes themselves are provided.

4. The throttle apparatus for an engine according to claim 1, wherein the pair of coupling portions are set to be substantially equal to each other in dimension from the corresponding throttle body to the abutting portions.

5. The throttle apparatus for an engine according to claim 1, wherein each of the pair of coupling portions has a shape tapered from the corresponding throttle body to the abutting portions in a side view along the throttle shafts.

6. The throttle apparatus for an engine according to claim 5, wherein each of the pair of coupling portions has the tapered shape through formation of a triangular rib in the side view along the throttle shafts.

7. The throttle apparatus for an engine according to claim 1, wherein one of the pair of coupling portions includes the abutting portions at two positions separated in an axial direction of the throttle shaft, and includes screw holes provided in the respective abutting portions, the other of the pair of coupling portions includes the abutting portions at two positions separated in the axial direction of the other of the throttle shafts, and includes female screw holes provided in the respective abutting portions, and the fastening members are a pair of screws screwed into the respective female screw holes through the screw holes from one direction.

* * * * *